United States Patent [19]

La Plante et al.

[11] 4,314,241
[45] Feb. 2, 1982

[54] COAL PIPE MONITOR

[75] Inventors: Donald W. La Plante, Randolph; Arthur Fairchild, Wayne; Eugene L. Rebucci, Mountain Lakes, all of N.J.

[73] Assignee: Merrick Scale Mfg. Company, Passaic, N.J.

[21] Appl. No.: 116,325

[22] Filed: Jan. 28, 1980

[51] Int. Cl.³ .......................................... G08B 21/00
[52] U.S. Cl. ................................... 340/603; 222/23; 250/575; 250/357; 250/359; 340/516; 340/606; 340/608; 340/617
[58] Field of Search ............... 340/603, 606, 608, 609, 340/610, 617, 516, 675, 676, 673; 361/170, 179; 250/303, 308, 356, 357, 358 R, 223 R, 359, 239, 575; 356/436, 438, 435; 222/23

[56] References Cited

U.S. PATENT DOCUMENTS

| | | | |
|---|---|---|---|
| 2,654,879 | 10/1953 | Jackson | 340/608 |
| 3,050,018 | 8/1962 | Pearson | 110/101 |
| 3,064,357 | 11/1962 | Butters | 250/357 X |
| 3,278,747 | 10/1966 | Ohmart | 250/359 |
| 3,280,328 | 10/1966 | Gieskieng | 250/359 |
| 3,577,158 | 5/1971 | Hahn | 250/356 |
| 3,582,647 | 6/1971 | Figuet | 250/357 |
| 3,582,647 | 6/1971 | Figuet et al. | 250/357 |
| 3,594,788 | 7/1971 | Seelig | 340/515 |
| 3,612,876 | 10/1971 | Grant | 250/358 |
| 3,678,268 | 7/1972 | Reim et al. | 250/358 R |
| 3,763,380 | 10/1973 | Homer et al. | 250/357 X |
| 4,210,809 | 7/1980 | Pelavin | 250/356 X |

*Primary Examiner*—John W. Caldwell, Sr.
*Assistant Examiner*—Daniel Myer
*Attorney, Agent, or Firm*—Seidel, Gonda, Goldhammer & Panitch

[57] ABSTRACT

Method and apparatus for monitoring the flow of coal from a bunker through a conduit to a coal feeder. A radiation sensitive detector detects the amount of coal present at a zone of the conduit and generates a stream of pulses which is sampled at discrete sample intervals of time to determine whether the conduit zone is empty, partially filled or filled. If the conduit zone is partially filled, a partial alarm is generated, and a determination is made as to whether the conduit zone is empty. If the conduit zone is empty, an empty alarm is generated and the feeder is stopped after a predetermined amount of coal has been deposited on the feeder. If the conduit zone is partially filled and a shut-off valve between the bunker and conduit is closed, a coal build-up alarm is generated. If the conduit zone is filled and the profile of coal at the feeder is not at full profile, a coal hang-up alarm is generated. If the conduit zone is partially filled and the profile of coal at the feeder is at full profile, a vent alarm is generated. A self-testing circuit periodically simulates each of these conditions to test the apparatus.

24 Claims, 15 Drawing Figures

COAL PIPE MONITOR

BACKGROUND OF THE INVENTION

The present invention is directed to a coal pipe monitor.

In particular, the invention is directed to method and apparatus for monitoring the flow of coal in a coal delivery system commonly employed in power plants. In such a system, the coal is delivered from a bunker through a conduit or downspout to a coal feeder. The coal is deposited on the feeder belt which transports the coal to a feed pipe. The coal flows through the feed pipe to a coal pulverizer. The feeder controls the rate of flow of coal to the pulverizer.

The pulverizer grinds the coal to a fine powder which is swept into a furnace by a primary air fan. This results in positive pressure of the hot primary air in the pulverizer. To maintain air flow from the feeder to the pulverizer, ambient temperature air is introduced into the feeder at higher pressure. This is referred to as seal air. The seal air serves to isolate the hot, coal dust laden air in the pulverizer from the feeder and the bunker.

The column of coal in the conduit acts as a restriction for the seal air. If the conduit should empty, the seal air would vent to atmosphere through the bunker. At the same time, the flow of coal to the pulverizer would stop, and the hot dusty air in the pulverizer would vent through the feeder into the bunker. The temperature in the pulverizer would rise, and the air/fuel ratio in the pulverizer would become lean and explosive. In addition, the furnace flame would become unstable, producing a situation with a very high potential for explosion.

The coal feeder is normally equipped to provide an alarm signal when the flow of coal into the pulverizer stops. At this time, however, it is too late to prevent the foregoing hazardous conditions in the pulverizer.

The present invention monitors the flow of coal through a zone of the conduit and senses an impending empty condition before the foregoing hazardous conditions occur.

The invention also provides data in respect to various operating conditions frequently encountered in the coal delivery system to permit rapid diagnosis of the system operation.

BRIEF SUMMARY OF THE INVENTION

The flow of coal is monitored from a bunker through a conduit to a coal feeder which delivers the coal to a pulverizer. A radiation sensitive detector detects the amount of coal present at a conduit zone just below the bunker. The detector generates a stream of pulses indicative of the amount of coal present at the conduit zone. The stream of pulses is counted during a discrete sample interval of time to determine the amount of coal passing through the conduit zone during that time.

If the amount of coal at the conduit zone is determined to be less than a first preselected amount, such that the zone is for example half-filled, a partial flow condition signal is generated. If a shut-off valve between the bunker and conduit is open, a partial alarm is generated to provide an early warning of potential coal loss. The signal can be used to activate bunker vibrators or to initiate shutdown of the system. A determination is then made as to whether the amount of coal at the conduit zone is less than a second preselected amount such that the zone is for example empty. If so, an empty flow condition signal is generated. Thereafter, the digital rate signal (lb/min) generated at the feeder is monitored to determine when a predetermined amount of coal has passed through the conduit to the feeder. An empty alarm is then generated, and the feeder is stopped. Accordingly, when the empty alarm is generated a head of coal remains in the conduit to insure sealing.

If a partial flow condition is detected and the shut-off valve is closed, a coal build-up alarm is generated. This alarm alerts the operator that a layer of coal has built up on the interior walls of the conduit.

If a partial flow condition is detected and the profile of coal at the feeder is less than full profile, a vent alarm is generated. This indicates that the conduit is not filled with coal and that pulverizer air may vent through the conduit to the bunker.

If no partial flow condition is detected while the feeder coal profile is less than full, a coal hang-up alarm is generated. This indicates that coal is stopped in the conduit between the bunker and feeder.

The radiation sensitive detector is monitored automatically. If the detector is malfunctioning, a tube fault alarm is generated to indicate the same.

Each of the foregoing conditions is simulated periodically to test the apparatus.

DETAILED DESCRIPTION OF THE INVENTION

Figure 1:
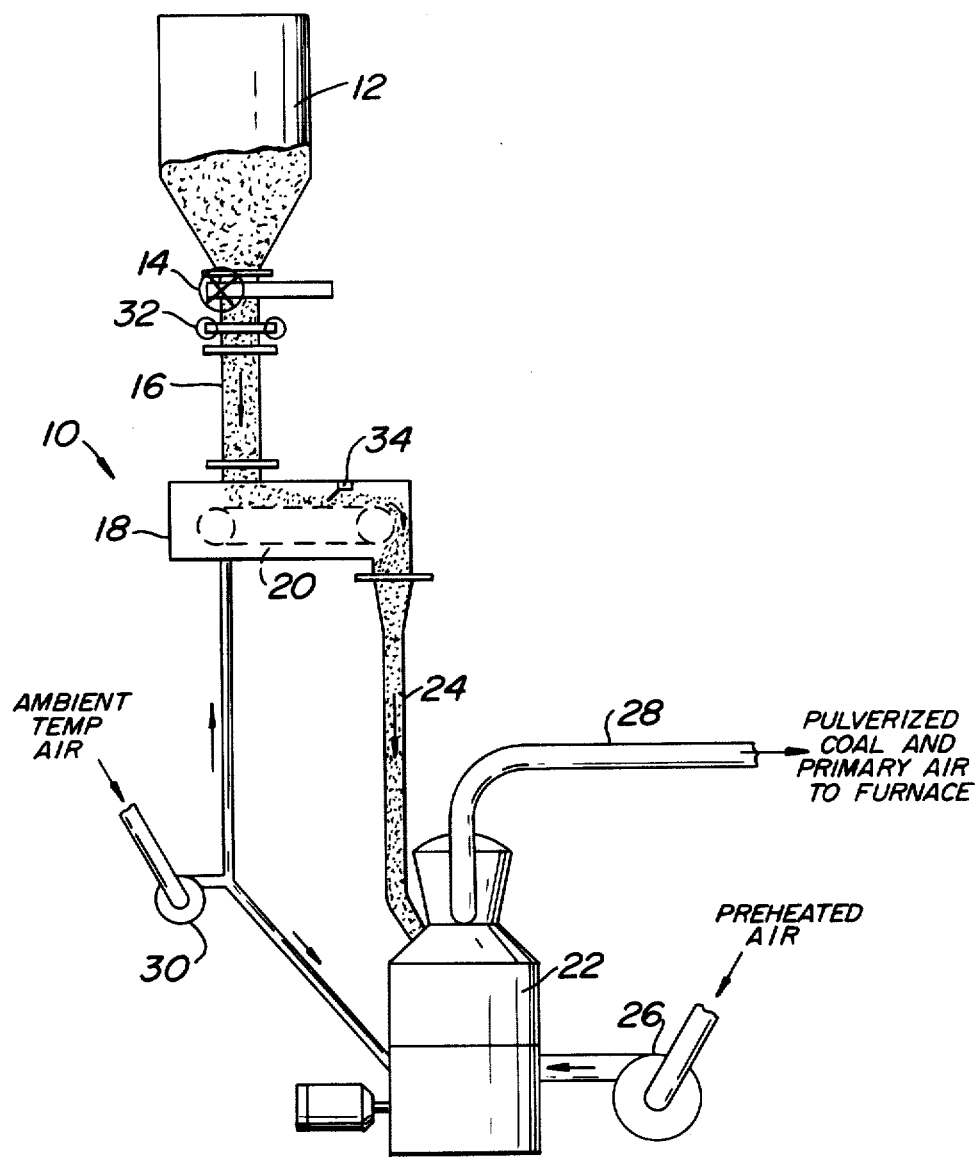
FIG. 1 is a diagram of a coal delivery system for a power plant.

Referring to the drawings where in like numerals indicate like elements, there shown in FIG. 1 a coal delivery system 10 for a power plant. The coal delivery system 10 includes a coal bunker 12 which serves as a storage facility for the coal. Coal stored in the bunker 12 flows through a shut-off valve 14 into a conduit or downspout 16. The shut-off valve 14 is manually operable between open and closed positions to interrupt the flow of coal from the bunker 12 to the conduit 16 if desired.

Coal flowing from the bunker 12 to the conduit 16 fills the conduit. The coal flows through the conduit and enters a coal feeder 18 such as the Merrick Model 480 feeder. The coal is transported on a feeder belt 20 and is fed to a pulverizer 22 via a pipe 24.

The pulverizer 22 grinds the coal to fine powder. A primary air fan 26 sweeps the fine coal powder from the pulverizer 22 into a furnace via a pipe 28. A seal air fan 30 introduces ambient temperature air into the feeder 18 and the pulverizer 22 to maintain airflow from the feeder to the pulverizer. This air introduced by fan 30 is referred to as seal air. The seal air serves to isolate the hot, coal dust laden air in the pulverizer 22 from the feeder 18 and the bunker 12.

The elements described thus far are well known in the power plant field. According to the present invention, a radiation sensitive detector 32 is mounted on the conduit 16 just below the shut-off valve 14. The detector 32 includes a radioactive source of gamma rays and a Geiger Meuller tube and circuit. The detector 32 is mounted on a U-shaped housing which attaches to the conduit 16 through shock mounts. By way of example, the radioactive source may be Cesium 137 having a strength of 50 millicuries. This source is housed in a steel encased lead structure provided with an aperture to pass the gamma radiation through the conduit 16 to the Geiger Meuller tube located on the opposite side of the conduit. It is preferred that the detector 32 be mounted near the top of the conduit 16 to sense an impending absence of coal in the conduit as early as possible.

The radioactive source provides a constant strength of gamma radiation through the conduit 16. The presence of coal in the conduit at the zone of the detector 32 reduces the amount of radiation which reaches the Geiger Meuller tube. This is due to absorption of the radiation by the coal. Thus, the detector 32 senses the amount of radiation which penetrates through the coal and reaches the Geiger Meuller tube. With no coal present, the detected radiation is relatively high. The level of radiation detected decreases proportional to the amount of coal in the conduit zone between the source and the Geiger Meuller tube.

The output of the detector 32 is a pulse signal comprising a stream of pulses. The number of pulses generated over any interval of time is inversly proportional to the amount of coal between the source and Geiger Meuller tube during that period of time. Thus, a relatively large number of pulses is generated when the conduit 16 is empty in the zone of the detector 32. Conversely, a relatively low number of pulses will be generated when the conduit 16 is filled in the zone of the detector 32.

In the present invention, the feeder 18 is provided with a profile switch 34. The switch 34 is mounted inside the feeder shell directly above the feeder belt 20. The switch 34 senses the height or profile of the coal on the belt 20. Switch 34 may be a SPDT mercury tilt switch having an arm which is displaced by contact with the coal on belt 20. When the conduit 16 is filled with coal, the coal on belt 20 is of sufficient height to lift the arm of switch 34. If the coal on belt 20 is not of sufficient height, the arm of the switch 34 drops. Thus, switch 34 is opened or closed depending on the profile of coal on belt 20.

Figure 2:
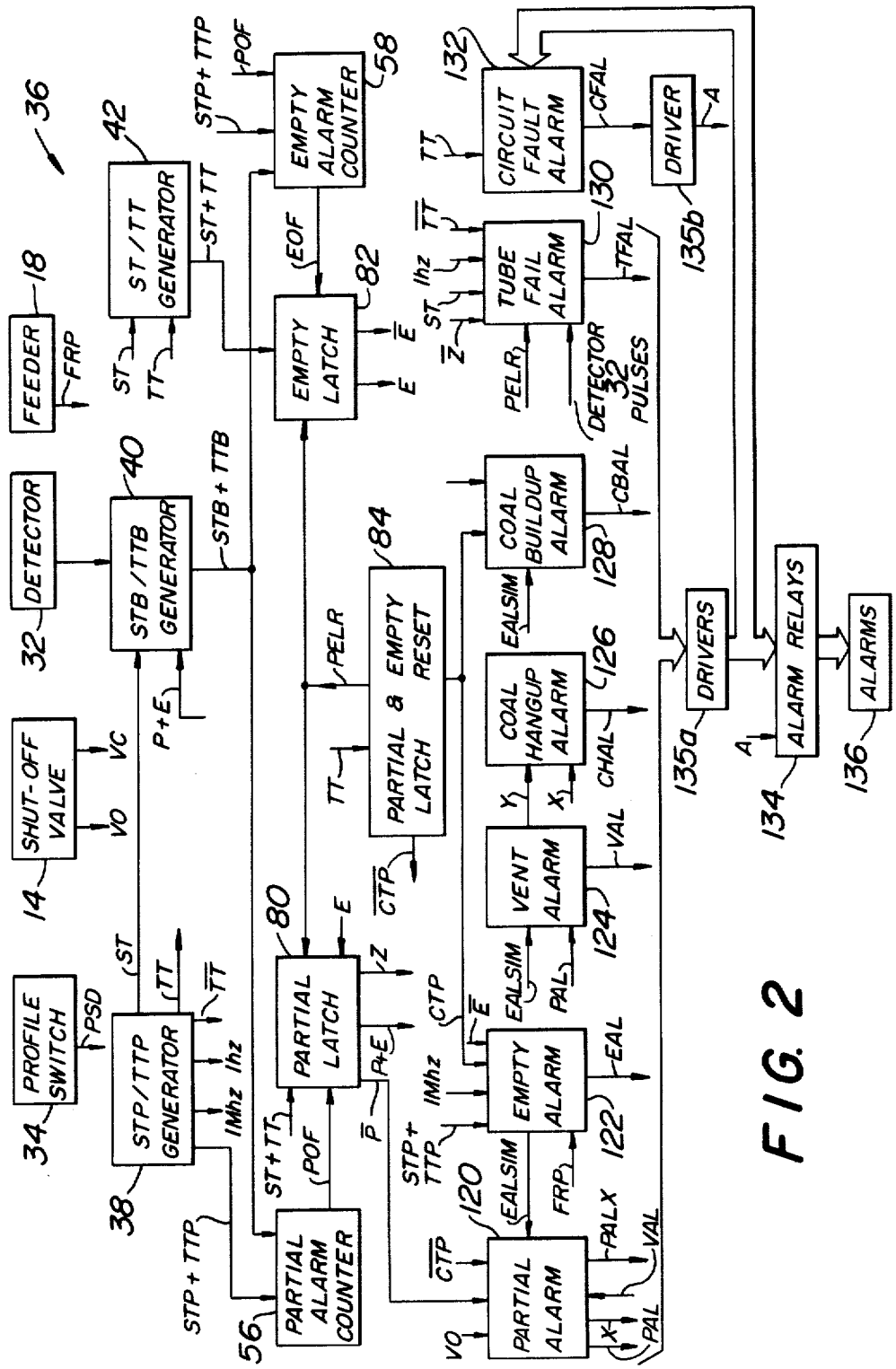
FIG. 2 is a block diagram of the coal pipe monitor of the present invention.

Referring to FIG. 2, the coal pipe monitor of the present invention is designated generally as 36. Coal pipe monitor 36 includes STP/TTP generator 38, STB/TTB generator 40 and ST/TT generator 42. Generators 38, 40 and 42 provide the basic timing signals for operation of the remainder of the circuitry of the coal pipe monitor 36.

Figure 3:
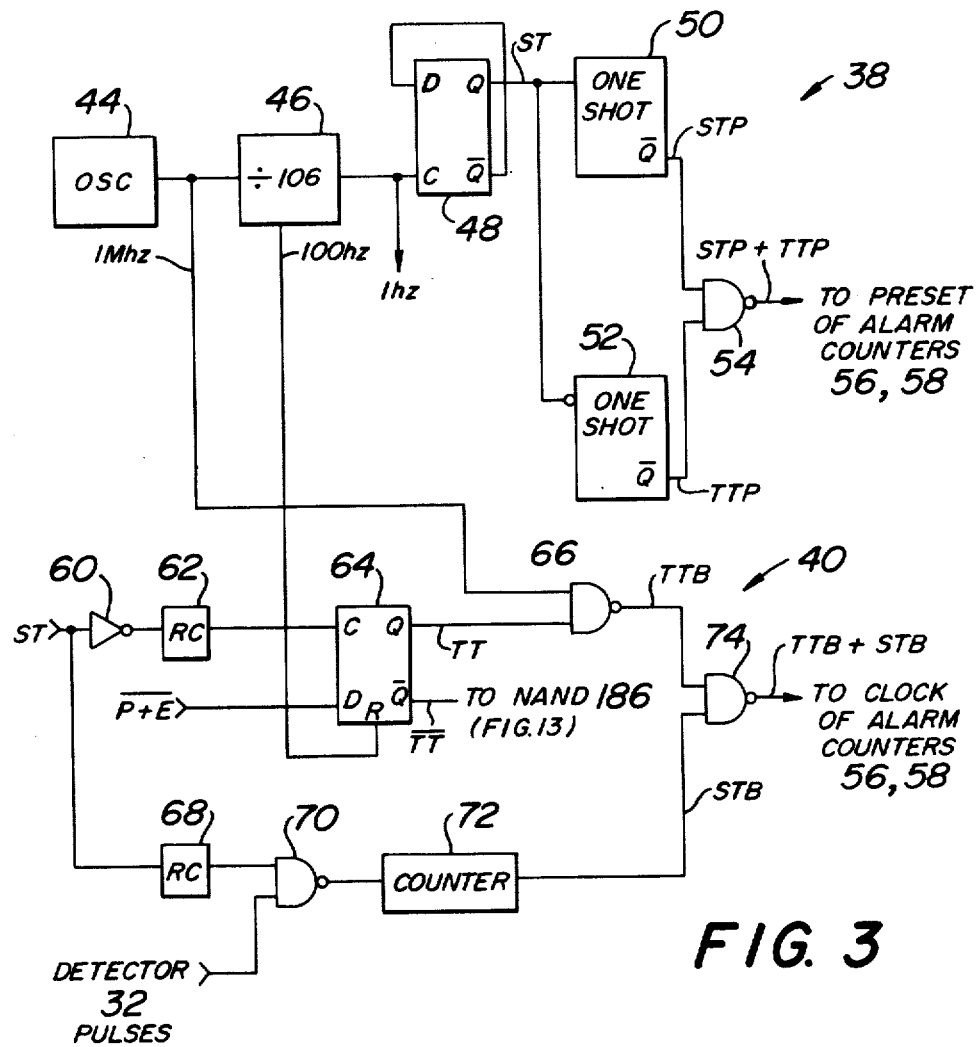
FIG. 3 is a diagram of the STB/TTB and STP/TTP generators.

Referring to FIG. 3, the STP/TTP generator 38 includes a crystal oscillator 44 which generates a 1 Mhz pulse train and a divider circuit 46 which divides down the 1 Mhz signal into a 100 hz signal and a 1 hz signal. The 1 hz signal clocks a divide by 2 circuit 48. Circuit 48 may be a flip-flop having inputs and outputs connected as shown. The Q output of circuit 48 is a 0.5 hz signal designated ST (Sample Time). See FIG. 15. During the ST pulse, the coal pipe monitor samples the output of detector 32 to determine flow conditions through conduit 16.

The leading edge of the ST signal triggers a one shot 50, and the trailing edge of the ST signal triggers a one shot 52. The Q outputs of one shots 50, 52, designated respectively STP (Sample Time Preset) and TTP (Test Time Preset), are 3 microsecond pulses. The STP and TTP signals are combined in NAND gate 54. The output of NAND gate 54 is designated STP+TTP. The STP+TTP signal is a stream of 3 microsecond pulses, the pulses being repeated at one second intervals. See FIG. 15. These pulses are used to preset a partial alarm counter 56 and an empty alarm counter 58 to a partial preset count and an empty preset count, respectively. See FIG. 2. The partial and empty alarm counters 56, 58 are presettable down counters. The partial and empty preset counts represent preselected numbers of pulses generated by radiation sensitive detector 32 during an ST pulse.

The partial preset count indicates whether a preselected amount of coal has passed through the conduit 16 at the zone of the detector 32 during the ST pulse. The preselected amount of coal is chosen as some fraction of the amount of coal which passes through the zone of the detector 32 when the zone is filled with coal. The fraction, for purposes of explanation herein, may be assumed to be 0.5. Thus, each STP+TTP pulse presets the partial alarm counter 56 to a partial preset count corresponding to the number of pulses which would be generated by the detector 32 during the ST pulse if the conduit were not more than half filled at the zone of the detector.

The empty alarm counter 58 is also preset by each STP+TTP pulse. The empty alarm counter 58 is preset to the empty preset count. The sum of the partial and empty preset counts indicates whether a minimum acceptable amount of coal has passed through the conduit 16 at the zone of the detector 32 during an ST pulse. For purposes of explanation herein, the sum of the preset counts represents that no coal has passed through the conduit zone during the ST pulse, i.e., that the conduit zone is empty. Operation of the partial alarm counter 56 and the empty alarm counter 58 is described in further detail below.

Reverting to FIG. 3, the ST signal is fed to the STB/TTB generator 40. The ST signal is inverted by inverter 60 and delayed by RC circuit 62 which is a 7 microsecond delay circuit. The output of RC circuit 62 clocks a flip flop 64. The Q output of the flipflop 64 is a 5 millisecond pulse designated TT (Test Time) and sets the duration of a test interval. During the TT pulse, the coal pipe monitor performs a self-test function as described more fully below. The TT pulse is combined with the 1 Mhz output of the crystal oscillator 44 by a NAND gate 66. The output of NAND 66 is a burst of pulses designated TTB (Test Time Burst).

The ST signal is also delayed by a RC circuit 68 which is a 7 microsecond delay circuit. The output of the RC circuit 68 is combined with the pulses generated by detector 32 by a NAND gate 70. The output of NAND gate 70 is therefore a burst of pulses. Each pulse in the burst clocks a counter 72. The counter 72 scales the pulse output of the NAND gate 70. The scaled output of the counter 72 is a burst of pulses designated STB (Sample Time Burst). The TTB and STB signals are combined by a NAND gate 74. The output of NAND gate 74 is designated TTB+STB. See FIG. 15. The TTB+STB signal clocks the alarm counters 56, 58.

Figure 4:
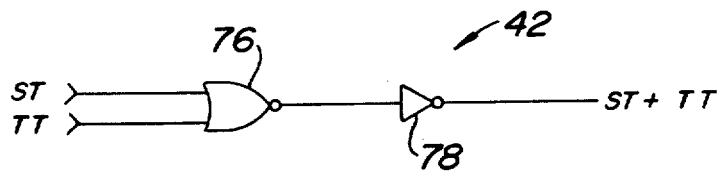
FIG. 4 is a diagram of the ST/TT generator.

The ST/TT generator 42 is shown in FIG. 4. The ST/TT generator 42 includes a NOR gate 76 which combines the ST and TT signals. The output of the NOR gate 76 is inverted by inverter 78. The output of inverter 78 is designated ST+TT. The ST+TT signal is the approximate envelope of the STB+TTB bursts. See FIG. 15.

The ST+TT signal controls the operation of a partial latch circuit 80 and an empty latch circuit 82. See FIG. 2. The partial latch and empty latch circuits 80, 82 are also controlled by the POF (Partial Over Flow) and EOF (Empty Over Flow) outputs of the partial alarm counter 56 and empty alarm counter 58, respectively. The POF signal is generated by the partial alarm counter 56 when the counter counts down the entire partial preset count during an STB or TTB burst. The EOF signal is generated by the empty alarm counter 58 when the counter counts down the entire empty preset count during an STB or TTB burst.

Figure 7:
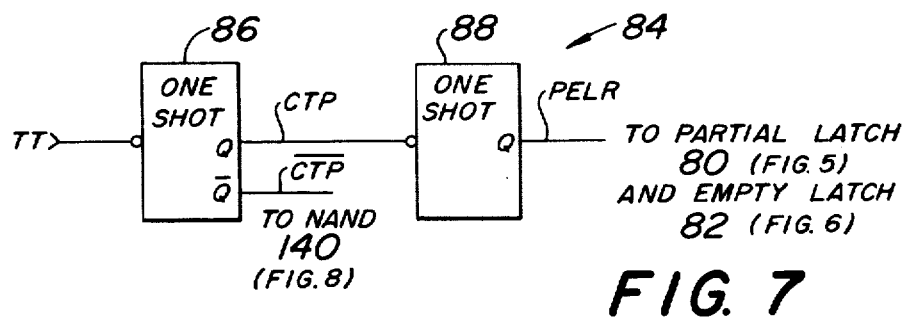
FIG. 7 is a diagram of the partial and empty latch reset

The partial latch circuit 80 and the empty circuit 82 are periodically reset by a PELR (Partial and Empty Latch Reset) signal generated by a partial and empty latch reset circuit 84. See FIG. 2. The partial and empty latch reset circuit 84 is shown in FIG. 7. The TT signal triggers a one shot 86 in the partial and empty latch reset circuit 84. The one shot 56 generates a 2 millisecond pulse, designated CTP (Circuit Test Pulse), at its Q output. See FIG. 15. The trailing edge of the CTP signal triggers a one shot 88 which generates a three millisecond pulse, designated PELR at its Q output.

DETECTION OF PARTIAL FLOW CONDITION

A. POF Signal Generated During ST

A partial flow condition indicates that the zone of the conduit 16 at the detector 32 is half-filled or less than half-filled (but not empty). The partial flow condition is indicated by the partial latch circuit 80. See FIG. 5. During an STB burst the partial alarm counter 56 counts down the detector 32 pulses from the partial preset count. If the counter 56 counts down the entire partial preset count within the STB interval, this indicates a partial flow condition and the counter 56 generates the POF signal. The POF signal clocks a flip-flop 90. Since the ST+TT signal input is "high" during the STB interval, see FIG. 15, the Q output of flip-flop 90 goes "high". The Q output of flip-flop 90 is fed to the inputs of flip-flops 92 and 94. The $\overline{Q}$ output of flip-flop 90 goes "low", removing the reset on flip-flop 92.

The trailing edge of the ST pulse (which marks the end of the STB burst) is transmitted by an inverter 96 to the clock input of flip-flop 94. Flip-flop 94 latches the Q output of flip-flop 90 which is "high" at this time. The Q output of flip-flop 94 is designated P. The P signal appears at the input of a NOR gate 98. Since the P signal is "high", the NOR gate 98 generates a "low" $\overline{P+E}$ signal. The $\overline{P+E}$ signal disables the flip-flop 64 in the STB/TTB generator 40. See FIG. 3. This prevents the TT pulse and the TTB burst from being generated. As a result, the PELR pulse is not generated by the partial and empty latch reset circuit 84. See FIG. 7. The Q output of flip-flop 92 (FIG. 5) remains "low", and NAND gate 100 transmits a "high" signal to one of the inputs of a NAND gate 102. Since the PELR signal is "low" at this time, an inverter 104 maintains the other input of NAND gate 102 "high". Accordingly, NAND gate 102 keeps the reset of flip-flop 90 released.

The rising edge of the next ST pulse clocks flip-flop 92. The Q output of flip-flop 92 therefore goes "high". Since the Q output of flip-flop 90 is still "high", the NAND gate 100 transmits a "low" signal to the input of NAND gate 102. The NAND 102 therefore resets flip-flop 90. The $\overline{Q}$ output of flip-flop 90 in turn resets flip-flop 92. The Q output of flip-flop 90 goes "low", and NAND gate 100 then causes NAND gate 102 to remove the reset from flip-flop 90.

At the trailing edge of this ST pulse, the P signal generated at the Q output of flip flop 94 goes "low" unless the partial alarm counter 56 generates another POF signal prior to the trailing edge of the ST pulse. If another POF signal is generated, the P signal stays "high" at the trailing edge of the ST pulse and no TT pulse is generated.

B. No POF Signal Generated During ST

If, during the ST pulse, the partial alarm counter 56 does not generate a POF signal, this indicates that the conduit 16 at the zone of the detector 32 is more than half filled with coal. This is an acceptable condition. The Q output of flip-flop 90 remains "low" since the flip-flop is not clocked by a POF signal. Also, the $\overline{Q}$ output of flip-flop 90 remains "high", keeping flip-flop 92 reset. The Q output of flip-flop 92 therefore remains "low", and the NAND gate 100 generates a "high" signal at the input of NAND gate 102. The inverter 104 maintains the other input of NAND gate 102 "high". Accordingly, the NAND gate 102 maintains the reset of flip-flop 90 released.

At the trailing edge of the ST pulse, the P signal generated at the Q output of flip-flop 94 stays "low", indicating no partial flow condition. The E input to NOR gate 98 will also be "low". Accordingly, the $\overline{P+E}$ output of NOR gate 98 is "high". This enables flip-flop 64 in the STB/TTB generator 40, see FIG. 3, to generate the TT pulse which sets a test time interval.

The rising edge of the TT pulse clocks flip-flop 92 but the Q output of the flip-flop stays "low" since the Q output of flip-flop 90 is "low". The NAND gate too therefore keeps the input of NAND gate 102 "high". The inverter 104 keeps the other input of the NAND gate 102 "high". Accordingly, NAND gate 102 keeps the reset of flip-flop 90 released.

During the TTB burst, the 1 Mhz pulses are counted down by partial alarm counter 56. The 1 Mhz frequency is sufficiently high to insure that the partial alarm counter 56 will generate the POF signal during the TTB burst to simulate a partial flow condition. The POF signal clocks the flip-flop 90, causing the Q output of the flip-flop to go "high". The $\overline{Q}$ output of flip flop 90 goes "low" to release the reset of flip-flop 92.

At the trailing edge of the TT pulse, (marking the end of the TTB burst) the flip-flop 94 latches the Q output of flip-flop 90. The P signal generated at the Q output of flip-flop 94 goes "high", indicating a partial flow condition (simulated). The PELR signal then resets flip-flop 94 and, via inverter 104 and NAND gate 102, it resets flip-flop 90. The $\overline{Q}$ output of flip-flop 90 in turn resets flip-flop 92. As a result, the partial latch circuit 80 is prepared for the next ST pulse (the next sample time interval) following the TT pulse. In particular the partial latch circuit 80 is prepared to respond in the partial alarm counter 56 as the counter monitors the next STB burst.

DETECTION OF EMPTY FLOW CONDITION

A. POF Signal Generated During ST

An empty flow condition is detected by empty latch circuit 82. See FIG. 6. Upon detection of a partial flow condition, the partial alarm counter 56 generates the POF signal as previously described. The POF signal enables the empty alarm counter 58. See FIG. 2. The empty alarm counter 58 then begins to count down the pulses in the STB burst from the empty preset count. If the empty alarm counter 58 counts down the entire empty preset count the counter generates the EOF signal. The EOF signal, therefore, is generated when no coal is passing through the conduit 16 at the zone of the detector 32. The EOF signal, in combination with the ST+TT signal, controls the operation of the empty latch circuit 82. The operation of the empty latch circuit 82 is substantially similar to the operation of the partial latch circuit 80.

1. EOF Signal Generated During ST

At the rising edge of the ST pulse, the D-input of a flip-flop 106 is empty latch circuit 82 goes "high". See FIG. 6. If the empty alarm counter 58 counts down the entire empty preset count, the counter generates the EOF signal and the EOF signal clocks flip-flop 106. The Q output of flip-flop 106 goes "high". The $\overline{Q}$ output of flip-flop 106 goes "low", releasing the reset of flip-flop 108.

At the trailing edge of the ST pulse, the output of an inverter 110 clocks a flip-flop 112. The flip-flop 112 latches the "high" Q output of the flip-flop 106. The Q output of flip-flop 112, designated E, therefore goes "high". This indicates an empty flow condition.

Assuming that a partial flow condition has previously been detected, the P input to NOR gate 98 goes "high" at the trailing edge of the ST pulse. The $\overline{P+E}$ output of NOR gate 98 is therefore "low". As previously explained, this disables flip-flop 64 in the STB/TTB generator 40, see FIG. 3, from generating the TT pulse. Accordingly, the PELR signal is "low". An inverter 114 receives the PELR signal and maintains the input to a NAND gate 116 "high". The Q output of flip-flop 108 is "low". This output is received by NAND gate 118 which keeps the other input of NAND gate 116 "high". Accordingly, NAND gate 116 keeps the reset of flip-flop 106 released.

At the rising edge of the next ST pulse the Q output of flip-flop 108 goes "high" since the Q output of flip-flop 106 is "high". As a result, the output of NAND gate 118 goes "low". The NAND gate 116, therefore, resets flip-flop 106. The $\overline{Q}$ output of flip-flop 106 in turn resets flip-flop 108. The Q output of flip-flop 108 therefore goes "low". Accordingly, the NAND gate 118 and the NAND gate 116 releases the reset of flip-flop 106.

A the trailing edge of this ST pulse, the E signal generated at the Q output of flip-flop 112 goes "low" unless another EOF signal is generated prior to the trailing edge of the ST pulse. If another EOF signal is generated, the E signal stays "high" at the trailing edge of the ST pulse and no TT pulse is generated.

2. No EOF Signal Generated During ST

At the rising edge of a ST pulse, the D-input of flip-flop 106 goes "high". See FIG. 6. If no EOF pulse occurs during a STB burst, this indicates that the conduit zone at detector 32 is half-filled or less than half filled but not empty. The Q output of flip-flop 106 remains "low". The $\overline{Q}$ output of flip-flop 106 remains "high", keeping the flip-flop 108 reset. At the trailing edge of the ST pulse, the E signal generated at the Q output of flip-flop 112 remains "low", indicating no empty flow condition. Assuming however, that a partial flow condition had previously been detected, the P input to NOR gate 98, see FIG. 5, goes "high". The $\overline{P+E}$ output of NOR gate 98 is therefore "low". Accordingly, flip-flop 64 in the STB/TTB generator 40, see FIG. 3, is disabled, the TT pulse is not generated, and the PELR input to inverter 114 remains "low".

The Q output of flip-flop 108 is also "low" since the flip-flop is maintained reset by the $\overline{Q}$ output of flip-flop 106. Accordingly, NAND gates 116 and 118 keep the reset of flip flop 106 released. The E signal generated at the Q output of flip-flop 112 remains "low" unless an EOF signal is generated during the next ST pulse. Operation of the empty latch circuit 82 in response to the EOF signal during an ST pulse is described above.

B. No POF Signal Generated During ST

If no POF signal is generated during an STB burst, the flip-flop 64 in the STB/TTB generator 40, see FIG. 3, generates a TT pulse which sets the test time interval. The 1 Mhz frequency of pulses within the TTB burst ensures that the partial alarm counter 56 generates a POF signal during the TTB burst. In addition, the 1 Mhz frequency ensures that the empty alarm counter 58 generates an EOF signal during the TTB burst. This simulates an empty flow condition.

Figure 6:
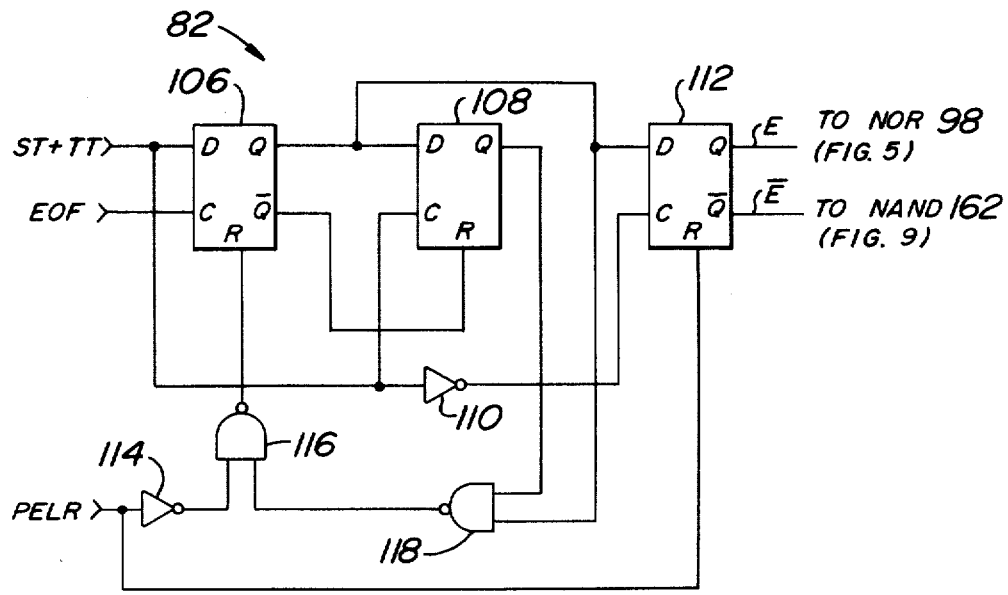
FIG. 6 is a diagram of the empty latch circuit.

When the EOF signal is generated, the Q output of flip-flop 106 in empty latch circuit 82, see FIG. 6, goes "high". At the trailing edge of the TT pulse, flip-flop 112 latches the Q output of flip-flop 106. The E signal at the Q output of flip-flop 112 goes "high", indicating a simulated empty flow condition.

After the trailing edge of the TT pulse, the PELR signal resets flip-flop 106 via inverter 116. See FIG. 6. The PELR signal also resets flip-flop 112. The E signal output of flip-flop 112 therefore goes "low". The $\overline{Q}$ output of flip-flop 106 maintains flip-flop 108 reset. In this condition, the empty latch circuit 82 is prepared for the next ST pulse.

FULL FLOW CONDITION

By full flow condition is meant that the conduit zone at the detector 32 is more than half-filled. For this condition, no POF signal is generated by the partial alarm counter 56. As a result, the P signal at the Q output of flip-flop 94, see FIG. 5, and the E signal at the Q output of flip-flop 112, see FIG. 6, are both "low". The $\overline{P+E}$ output of NOR gate 93, see FIG. 5, therefore is "high", indicating the full flow condition. Detection of the full flow condition is useful in generating a coal hang-up alarm as described below.

OPERATION OF ALARM CIRCUITS

The coal pipe monitor 36 includes seven alarm circuits, see FIG. 2, including a partial alarm circuit 120, an empty alarm circuit 122, a vent alarm circuit 124, a coal hang-up alarm circuit 126, a coal build-up circuit 128, a tube fail alarm circuit 130 and a circuit fault alarm circuit 132. Each of the alarm circuits 120-132 is separately associated with its own driver and alarm relay. The group of drivers is designated 135a and 135b in FIG. 2. The group of relays is designated 134. Each relay is associated with and operates its own alarm, such as a light or horn. The group of alarms is designated 136.

PARTIAL ALARM CIRCUIT 120

Figure 5:
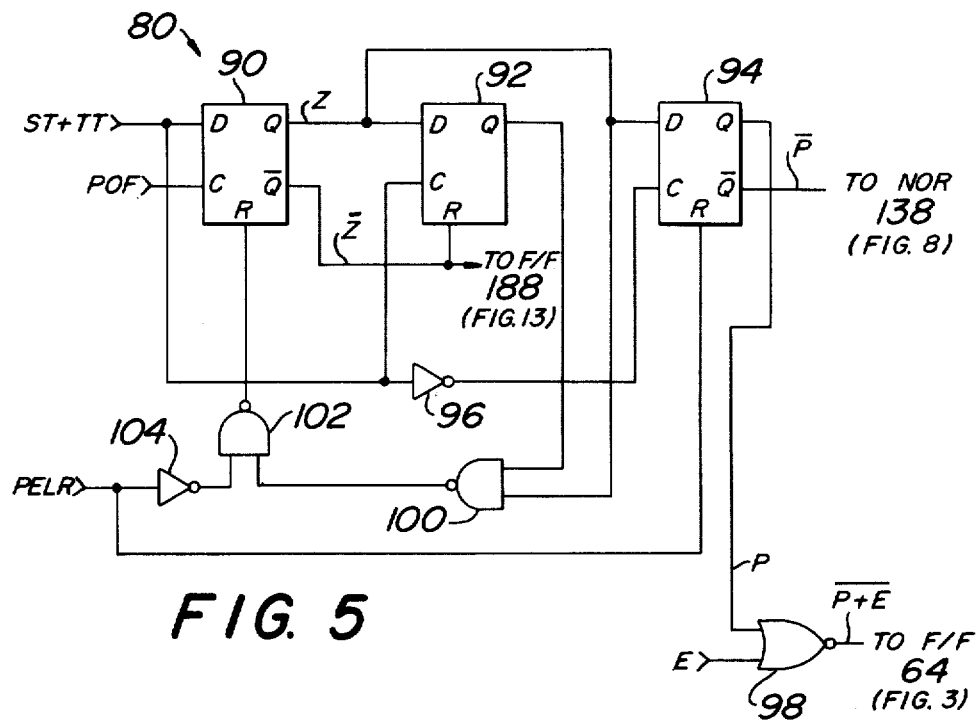
FIG. 5 is a diagram of the partial latch circuit.

As previously described, if a partial flow condition is detected, the P signal output of flip-flop 94 in partial latch circuit 80, see FIG. 5, goes "high" at the trailing edge of the ST pulse. The $\overline{P}$ signal generated at the $\overline{Q}$ output of flip-flop 94 therefore goes "low". The $\overline{P}$ signal appears at the input of a NOR gate 138 in the partial alarm circuit 120. See FIG. 8.

If the shut-off valve 14 is open, an SPDT limit switch incorporated in the valve generates a VO (Valve Open) signal which is "low". The VO signal appears at the input of NAND gate 140. The output of NAND gate 140 is connected to the input of an inverter 142. The output of inverter 142 maintains a second input to NOR gate 138 "low". The third input to the NOR gate 138 is a EALSIM (Empty Alarm Simulated) signal generated by the empty alarm circuit 122. See FIG. 9. As explained below, if an empty alarm has not been generated, the EALSIM signal is "low". The output of NOR gate 138, designated PAL (Partial Alarm), is therefore "high". The PAL signal is inverted by a NAND gate 144 and reinverted by an inverter 146. The output of inverter 146, designated PALX, operates a partial alarm relay in the alarm relays 134 via an associated partial alarm driver in drivers 135a. The partial alarm relay in turn activates a partial alarm in the alarms 136 to indicate that a partial flow condition has been detected.

The output of inverter 146 may also be used to activate a switch relay which controls a bunker vibrator (not shown). The vibrator shakes the bunker 12 to assist the flow of coal from the bunker to conduit 16.

EMPTY ALARM CIRCUIT 122

If an empty flow condition has been detected, the E signal output of flip-flop 112 in empty latch circuit 82, see FIG. 6, goes "high" at the trailing edge of the ST pulse. The E signal appears at the input of a NAND gate 148 in the empty alarm circuit 122. See FIG. 9. A NAND gate 150 maintains a second input of the NAND gate 148 "high". A NAND gate 152 passes the feeder rate pulses, designated FRP, to the third input of the NAND gate 148. The FRP signal is a stream of pulses generated by the feeder 18 which represent the rate in lb/min. at which coal is transported by the feeder.

The FRP pulses are passed by NAND gate 152 and NAND gate 148 to inverter 154. Inverter 154 transmits the pulses (inverted) to a delay counter 156. The delay counter 156 counts down the FRP pulses from a predetermined preset count. The preset count represents the amount of coal which can flow through the conduit 16 into the feeder 18, after an empty flow condition is detected, while ensuring that enough coal remains in the conduit to provide a seal when the feeder is shut-off. The feeder is shut-off in response to a EAL (Empty Alarm) signal generated at the Q output of a flip-flop 158 in the empty alarm circuit 122. See FIG. 9. Any suitable switching device, such as a relay switch, sensitive to the EAL signal may be used to shut the feeder off. The EAL signal is generated (goes "high") in response to a clock signal transmitted by inverter 160 when the delay counter 156 counts down the full preset count.

EXAMPLE

A 24 inch diameter conduit which is 10 feet long (from feeder 18 inlet to shut-off valve 14), may require a 4 foot head of coal for sealing. The delay counter 156 is therefore preset to a count corresponding to the weight of a 6 foot head of coal. Thus, the 24 inch diameter conduit has a volume of 3 cubic feet per foot of length. Approximating the density of the coal at 50 pounds per cubic foot, there will be 150 pounds of coal per foot of length. The 6 foot head of coal therefore weighs 900 pounds. The delay counter 156 is therefore preset to 900 pounds. After counting down the FRP pulses which correspond to the full preset count of 900 pounds, a 4 foot head of coal would remain in the conduit. This would be sufficient to provide a seal when the EAL signal is generated, i.e., when the feeder 18 is stopped.

The EAL signal operates an empty alarm relay in the group of relays 134 via an associated empty alarm driver in drivers 135a. The empty alarm relay in turn activates an empty alarm in the group of alarms 136 to indicate that an empty flow condition has been detected.

The delay counter 156 affords a delay interval of time, following detection of an empty flow condition and prior to generation of an empty alarm, during which the flow of coal through the conduit 16 may be restored by replenishing the coal supply in the bunker 12. The delay counter 156 could be replaced by a suitable equivalent delay device for this purpose.

The delay counter 156 is preset to the predetermined preset count at the rising edge of each STP or TTP pulse via a NAND gate 162 and inverter 164. AT the end of an STP or TTP pulse, the NAND gate 162 and inverter 164 release the preset on delay counter 156. When an empty flow condition is detected, the $\overline{E}$ signal generated at the $\overline{Q}$ output of flip-flop 112 in empty latch circuit 82, see FIG. 6, goes "low", thereby releasing the reset of flip-flop 158 in empty alarm circuit 122, FIG. 9. The $\overline{E}$ signal maintains flip-flop 158 in the reset condition until the empty flow condition is detected.

VENT ALARM CIRCUIT 124

A vent alarm condition is defined as a partial flow condition and a profile of coal on the feeder belt 20 which is below full profile. This combination of conditions occurs when coal is restricted at the conduit zone of detector 32, i.e. just below the bunker 12, so that the coal "rains" down the conduit instead of filling the conduit. As is the case for an empty flow condition, in a vent alarm condition the seal is lost. If this condition goes unremedied, when the bunker 12 runs empty, coal flow to the pulverizer will suddenly stop. It is desirable to generate an alarm when this combination of conditions is detected, i.e., before the bunker 12 runs empty.

If the profile switch 34 is down, indicating less than full coal profile on the feeder belt 20, the profile switch generates a "low" PSD (Profile Switch Down) signal. See FIG. 2. As a result, a NAND gate 166 and an inverter 168 in vent alarm circuit 124, see FIG. 10, generate a "low" signal at the input of a NOR gate 170. The NOR gate 170 enables a NAND gate 172. The PAL signal appears at the other input to NAND gate 172. As previously described, when a partial alarm is generated the PAL signal is "high". The NAND gate 172 and an inverter 174 therefore generate a "high" VAL (Vent Alarm) signal. The VAL signal operates a vent alarm relay in relays 134 via an associated vent alarm driver in drivers 135a. The vent alarm relay in turn activates a vent alarm in alarms 136 to indicate the vent condition, i.e., the combination of a partial condition and a less than full coal profile at the feeder.

COAL HANG-UP ALARM CIRCUIT 126

If no partial condition is detected, that is, if the conduit at the zone of detector 32 is more than half-filled with coal, and the profile switch 34 indicates less than full coal profile on the feeder belt 20, a coal hang-up condition exists. Thus, the flow of coal in the conduit has stopped between the zone of the detector 32 and the inlet of feeder 18.

If the profile switch 34 indicates less than full coal profile on the feeder belt, the PSD signal is "low". See FIG. 10. As a result, the NAND gate 166 and the inverter 168 in vent alarm circuit 124 cause the NOR gate 170 to generate a "high" Y output signal. If a partial condition has not been detected, i.e., the conduit at detector 32 is more than half-filled, the PAL signal is "low". As a result, the VAL signal generated by inverter 174 is "low" indicating no vent condition.

The VAL signal appears at the input of a NAND gate 176 in the partial alarm circuit 120. See FIG. 8. The output of the NAND gate 176, designated X, is therefore "high", during a coal hang-up condition. The X and Y signals are transmitted to a NAND gate 178 in the coal hang-up alarm circuit 126. See FIG. 11. Accordingly, the NAND gate 178 causes an inverter 180 to generate a "high" CHAL (Coal Hang-Up Alarm) signal. The CHAL signal operates a coal hang-up relay in relays 134 via an associated coal hang-up driver in drivers 135a. The coal hang-up relay in turn activates a coal hang-up alarm in alarms 136 to indicate a coal hang-up condition.

Figure 8:
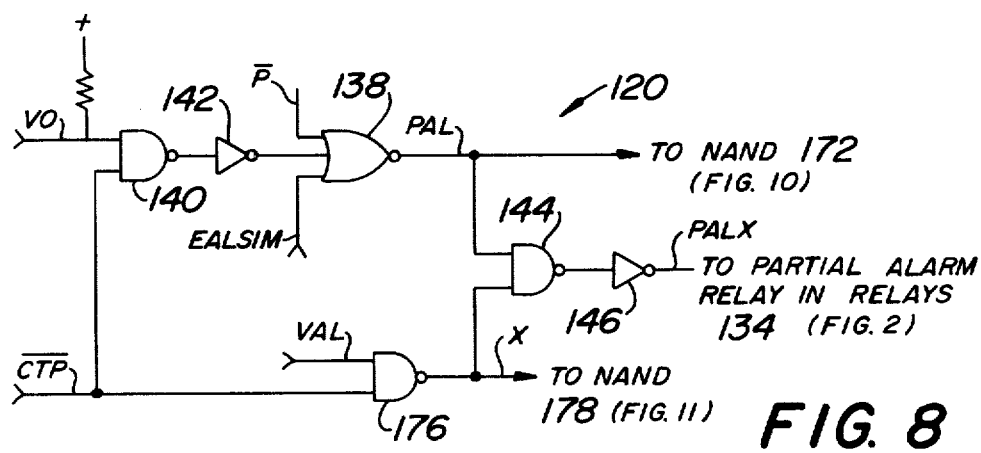
FIG. 8 is a diagram of the partial alarm circuit.
Figure 10:
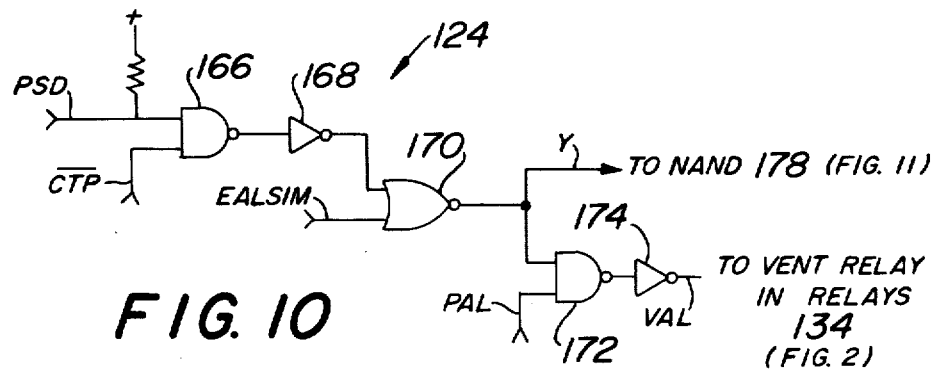
FIG. 10 is a diagram of the vent alarm circuit.
Figure 11:
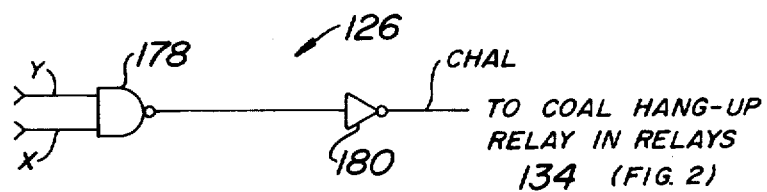
FIG. 11 is a diagram of the coal hang-up alarm circuit.

If a vent condition is detected, the VAL signal generated by inverter 174 in vent alarm circuit 124, see FIG. 10, is "high" as previously described. As a result, the X output of NAND gate 176 in the partial alarm circuit 120, see FIG. 8, is "low". This causes the PALX output of inverter 146 to go "low", disabling the partial alarm relay. Since the X signal is "low", the CHAL output of inverter 180 in coal hang-up alarm circuit 126, see FIG. 11, is also "low", disabling the coal hang-up relay. Thus, both the coal hang-up and partial alarms are disabled when the vent alarm is activated.

COAL BUILD-UP ALARM CIRCUIT 128

If the shut-off valve 14 is closed, the conduit 16 should be either empty or full. If a partial flow condition is detected at this time, it indicates that there is a layer of coal built up on the interior walls of the conduit. This condition tends to occur when the coal is wet and the flow of coal in the conduit has been interrupted. The coal build-up alarm provides an indication of this condition.

If shut-off valve 14 is closed, the shut-off valve switch generates a "low" VC (Valve Closed) signal. The VC signal appears at the input of a NAND gate 180 in the coal build-up alarm circuit 128. See FIG. 12. The NAND gate 180 and an inverter 182 therefore generate a "low" signal at the input of a NOR gate 182. The EALSIM signal appearing at the other input of the NOR gate 182 is "low" following detection of a partial condition so long as an empty alarm is not generated.

Figure 9:
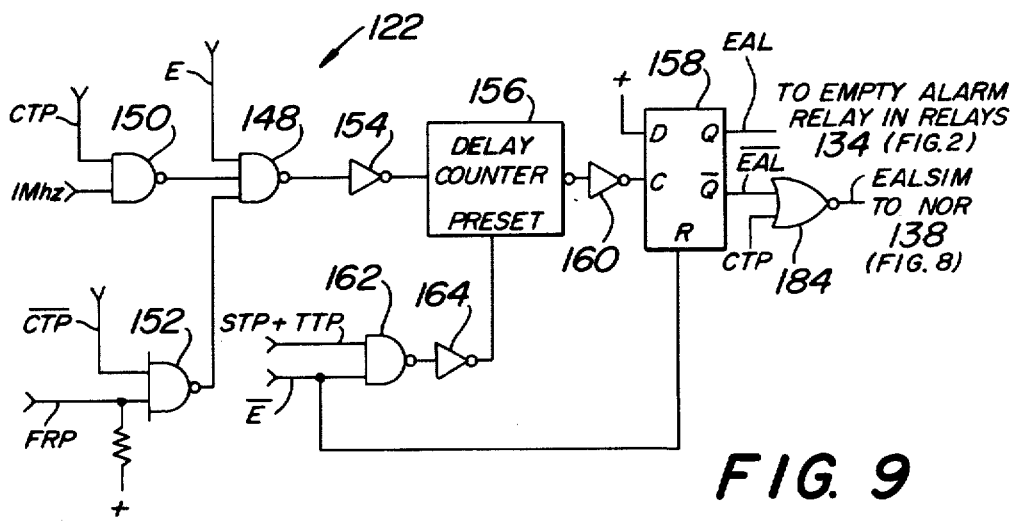
FIG. 9 is a diagram of the empty alarm circuit.

Thus, referring to FIG. 9, the flip-flop 158 in empty alarm circuit 122 generates a "high" $\overline{EAL}$ signal so long as the flip-flop remains reset by the $\overline{E}$ signal. As previously explained, the $\overline{E}$ signal maintains the flip-flop reset so long as no empty flow condition is detected. Since the $\overline{EAL}$ signal is "high", a NOR gate 184 maintains the EALSIM signal "low".

Under the foregoing conditions, the NOR gate 182 in the coal build-up alarm circuit 128 produces a "high" CBAL (Coal Build-Up Alarm) signal. See FIG. 12. The CBAL signal operates a coal build-up alarm relay in the alarm relays 134 via an associated coal build-up alarm driver in drivers 135a. The coal build-up alarm relay in turn activates a coal build-up alarm to indicate a coal build-up condition.

TUBE FAIL ALARM CIRCUIT 130

Figure 13:
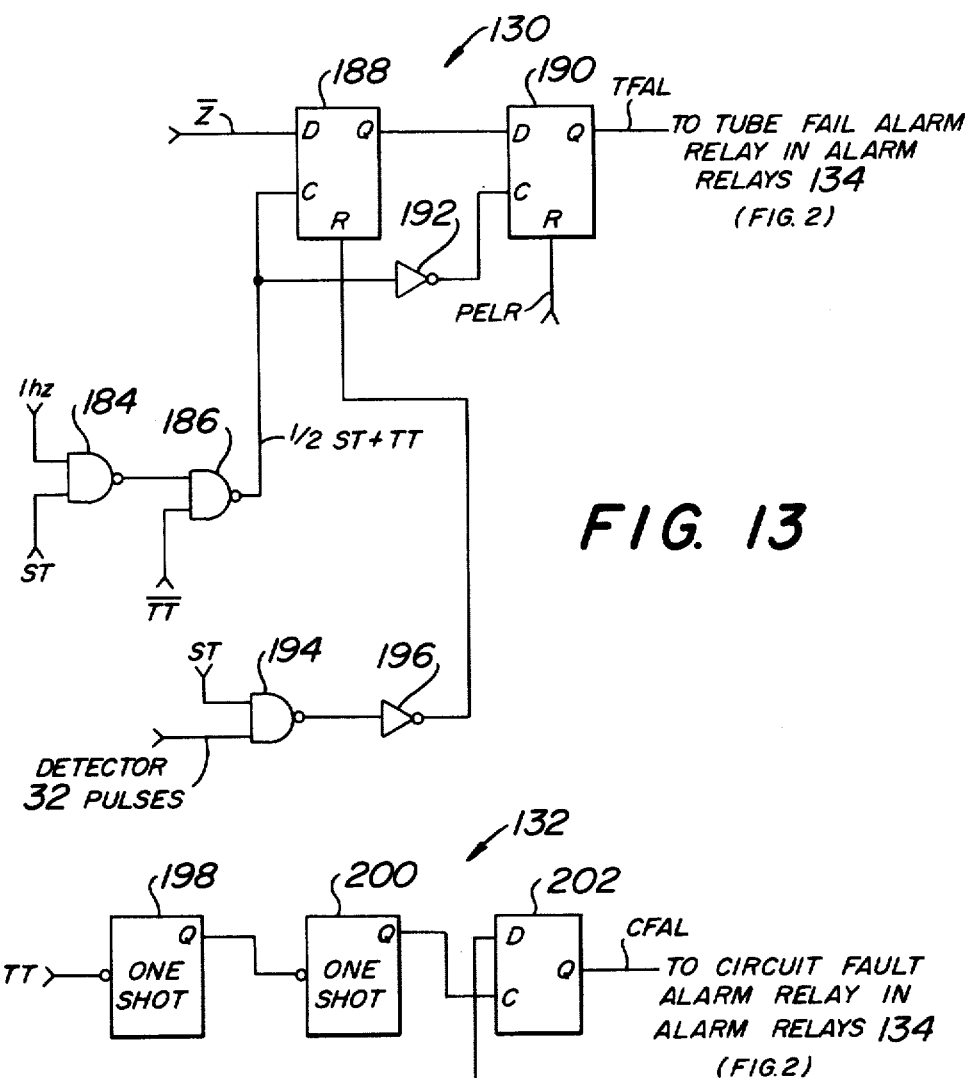
FIG. 13 is a diagram of the tube fail alarm circuit.
Figure 15:
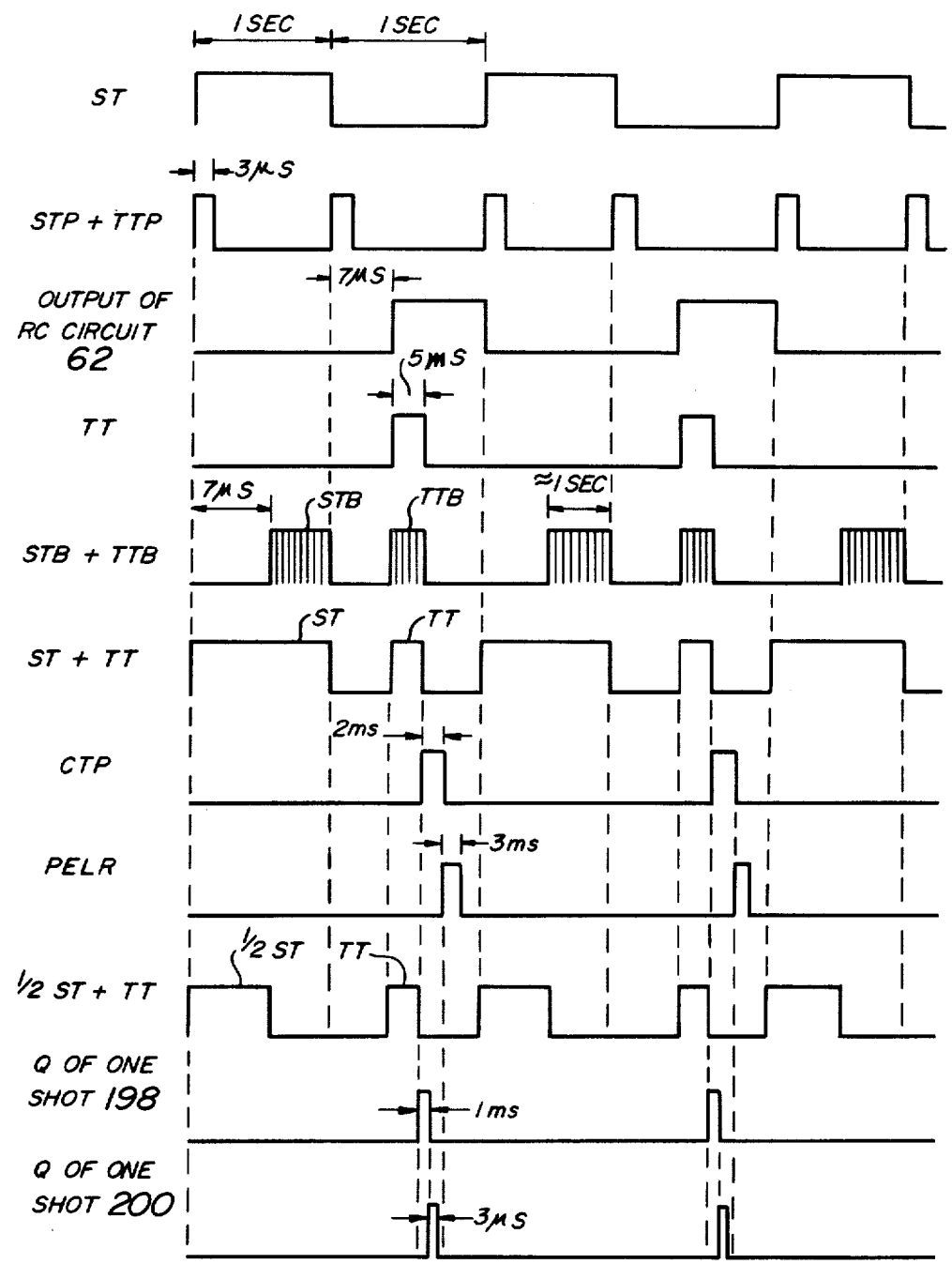
FIG. 15 is a chart of various signals generated by the coal pipe monitor.

The Geiger Meuller tube in detector 32 is monitored during the first half of each ST pulse and during each TT pulse by the tube fail alarm circuit 130. See FIG. 13. The 1 hz pulse output of the STP/TTP generator 38 is applied to a NAND gate 184. The ST signal is applied to the other input of NAND gate 184. A NAND gate 186 combines the output of the NAND gate 184 with the $\overline{TT}$ signal generated by flip-flop 64 in the STB/TTB generator 40 (FIG. 3). The output of NAND gate 186 is designated ½ST+TT. The waveform of this signal is shown in FIG. 15. The rising edge of each ½ST pulse and each TT pulse clocks a flip-flop 188. See FIG. 13. The trailing edge of each ½ST and each TT pulse clocks a flip-flop 190 via an inverter 192.

The D-input of flip-flop 188 receives a $\overline{Z}$ signal generated at the $\overline{Q}$ output of flip-flop 90 in partial latch circuit 80. See FIG. 5. At the rising edge of a ST pulse, the $\overline{Z}$ signal is "high". Since the rising edge of a ½ST pulse concides with the rising edge of a ST pulse, the Q output of flip-flop 188 therefore goes "high". The reset of flip-flop 188 is controlled by a NAND gate 194 and an inverter 196. If, during a ST pulse, no pulse is generated by the detector 32, the NAND gate 194 and inverter 196 keep the reset of flip-flop 188 released. As a result, the trailing edge of the ½ST pulse clocks the flip-flop 190 via inverter 192, and flip-flop 190 generates a "high" TFAL (Tube Fail Alarm) signal at its Q output. The TFAL signal operates a tube fail alarm relay in the alarm relays 134 via an associated tube fail alarm driver 135a. The tube fail alarm relay in turn activates a tube fail alarm in alarms 136 to indicate that the Geiger Meuller tube in detector 32 is malfunctioning.

If, during a ST pulse, the detector 32 generates a pulse, the NAND gate 194 and inverter 196 reset flip-flop 188. As a result, when the trailing edge of the ½ST pulse clocks flip-flop 190 the D-input to the flip-flop is "low", the TFAL signal will be "low", and no tube fail alarm will be generated.

A malfunction of the Geiger Meuller tube is simulated during each TT pulse to test the tube fail alarm relay. During a TT pulse, the ST signal is "low" so that NAND gate 194 and inverter 196 maintain the reset of flip-flop 188 released. Any detector 32 pulses are ignored by NAND gate 194 so that flip-flop 188 is not reset during the TT pulse. At the rising edge of the TT pulse, the $\overline{Z}$ signal at the D-input of flip-flop 188 is "high" and the flip-flop is clocked. The D-input of flip-flop 190 goes "high". At the trailing edge of the TT pulse, the flip-flop 190 is clocked via inverter 192. Accordingly, the TFAL output of flip-flop 190 goes "high", ultimately activating the tube fail alarm. This simulates a failure of the Geiger Meuller tube.

SELF-TEST OPERATION OF ALARM CIRCUITS

Self-testing of the alarm circuits 120-130 occurs during each TT pulse. It will be recalled that the TT pulse is generated after an ST pulse so long as no partial flow condition is detected during the ST pulse. During the TT pulse, all conditions are simulated to allow all alarm relays 134 to energize. The TT pulse is 5 milliseconds long whereas the ST pulse is 1 second long. Accordingly, self-test of the coal pipe monitor 36 during a TT pulse is much faster than the normal detection functions based on sampling of the detector 32 pulses during a ST pulse.

At the trailing edge of the ST pulse, a TTP pulse is generated. See FIG. 15. The TTP pulse presets the partial alarm and empty alarm counters 56, 58 in advance of a TT interval. After a delay of 7 microseconds, flip-flop 64 in the STP/TTP generator 38 is clocked. See FIG. 3. A TT pulse is then generated at the Q output of flip-flop 64 for 5 milliseconds. At the end of 5 milliseconds, the 100 hz output of the divider circuit 46 resets flip-flop 64. The TT pulse enables the NAND gate 66 to pass the 1 Mhz pulses, thus forming the TTB burst. Since the TTB burst contains 5,000 pulses, both the partial alarm and empty alarm counters 56, 58 will count down their full preset counts, and the POF and EOF signals will be generated. Accordingly, flip-flop 94 in partial latch circuit 80, see FIG. 5, generates a "high" P signal and a "low" $\bar{P}$ signal, flip-flop 112 in empty latch circuit 82, see FIG. 6, generates a "high" E signal and a "low" $\bar{E}$ signal; and NOR gate 184 in empty alarm circuit 122 generates a "low" EALSIM signal, see FIG. 9.

At the trailing edge of the TT pulse, the one shot 86 in the partial and empty latch reset circuit 84, see FIG. 7, generates the 2 millisecond CTP pulse ("high") as well as the compliment pulse $\overline{CTP}$ ("low"). The $\overline{CTP}$ pulse disables NAND gate 140 in the partial alarm circuit 120, see FIG. 8, thereby simulating a "low" VO signal. The pulse also disables NAND gate 176 and the NAND gate generates a "high" X output. The NOR gate 138 generates a "high" PAL signal since all its inputs are "low". The NAND gate 144 and inverter 146 therefore generate a "high" PALX signal to activate the partial alarm relay and generate a partial alarm.

After the partial alarm is generated, the CTP pulse enables NAND gate 150 in empty alarm circuit 122, see FIG. 9, to pass the 1 Mhz pulses to the delay counter 156 via NAND gate 148 and inverter 154. The delay counter 156 counts down its full preset count and clocks flip-flop 158 via inverter 160. Flip-flop 158 generates a "high" EAL signal at its Q output. The EAL signal activates the empty alarm relay to generate an empty alarm.

The CTP pulse also causes NOR gate 184 in empty alarm circuit 122 to generate a "low" EALSIM signal. This simulates a "not empty" condition and permits the remaining alarm relays to be tested.

The $\overline{CTP}$ signal disables NAND gate 166 in vent alarm circuit 124, see FIG. 10, thereby simulating a "low" PSD signal. Inverter Since the EALSIM signal is "low", the NOR gate 170 generates a "high" Y signal at the input of NAND gate 172. The PAL signal at the other input of NAND gate 172 is also "high". As a result, inverter 174 generates a "high" VAL signal, activating the vent alarm relay to generate a vent alarm.

The "high" Y signal appears at the input of NAND gate 178 in coal hang-up alarm circuit 126, see FIG. 11. The other input of NAND gate 178 is the X signal generated by NAND gate 176 in partial alarm circuit 120. See FIG. 8. Since the $\overline{CTP}$ signal is "low", the X signal is "high". As a result, the NAND gate 178 generates a "low" signal output, and inverter 180 generates a "high" CHAL signal, activating the coal hang-up relay to generate a coal hang-up alarm.

Figure 12:
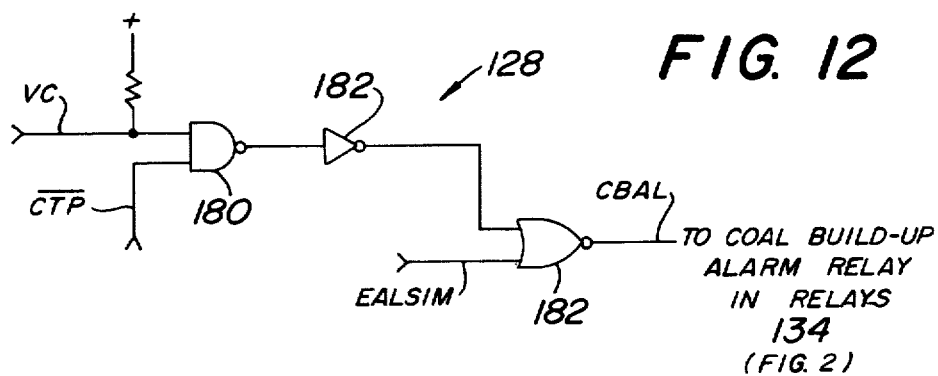
FIG. 12 is a diagram of the coal build-up alarm circuit.

The $\overline{CTP}$ signal also disables NAND gate 180 in coal build-up alarm circuit 128, see FIG. 12 to simulate a "low" VO signal. Inverter 182 therefore generates a "low" signal at the input of NOR gate 182. Since the EALSIM signal is "low", the NOR gate 182 generates a "high" CBAL signal, activating the coal build-up relay to generate a coal build-up alarm.

CIRCUIT FAULT ALARM CIRCUIT 132

Figure 14:
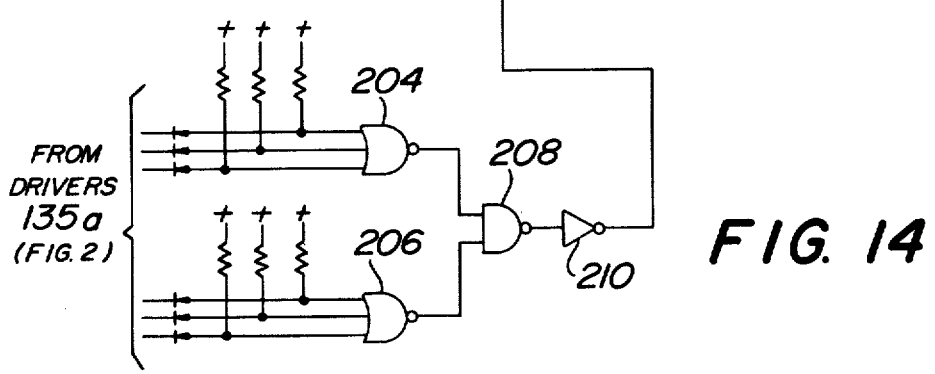
FIG. 14 is a diagram of the circuit fault alarm circuit.

As indicated above, the partial and empty alarm relays are energized during the TT pulse, and the vent alarm, coal hang-up alarm and coal build-up alarm relays are energized during the CTP pulse. The tube fail alarm relay is also energized during the TT pulse as previously described. The trailing edge of the TT pulse is coincident with the rising edge of the CTP pulse. The TT pulse triggers a one shot 198 in the circuit fault alarm circuit 132. See FIG. 14. The one shot 198 produces a 1 millisecond pulse at its Q output. The trailing edge of the 1 millisecond pulse is coincident with the middle of the CTP pulse. The trailing edge of the 1 millisecond pulse triggers a one shot 200. The one shot 200 generates a 3 microsecond pulse at its Q output. The 3 microsecond pulse clocks a flip-flop 202.

Each of the alarm relays 134 is associated with a driver in drivers 135a. Each driver receives an output signal from the associated alarm circuit 120-130. When the output of an alarm circuit is "high", indicating an alarm condition, the output of the associated driver is "low". The outputs of drivers 135a, i.e. all drivers associated with alarm circuits 120-130, are transmitted to the NOR gates 204 and 206 in the circuit fault alarm circuit 132. See FIG. 14. If any of the outputs of the drivers 135a is not "low", the output of NOR gate 204 or NOR gate 206 (or both) will be "low", disabling a NAND gate 208. The output of the NAND gate 208 therefore goes "high", and an inverter 210 applies a "low" signal to the D-input of flip-flop 202. When the flip-flop 202 is clocked by the 3 microsecond pulse generated by one shot 200, the Q output of the flip-flop will be "low", de-energizing the circuit fault alarm relay. Preferably, the circuit fault alarm relay is normally energized to provide the added feature of monitoring the power supply (not shown) for the coal pipe monitor circuitry.

The circuit fault alarm relay in relays 134 is controlled by the output A of driver 135b. Driver 135b is controlled by the CFAL output of the circuit fault alarm circuit 132.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for monitoring the flow of coal from a coal bunker through a conduit to a feeder which delivers the coal to a pulverizer, comprising:

means for detecting the amount of coal present at a conduit zone between the bunker and the feeder and for generating a pulse signal indicative thereof, means responsive to said pulse signal for determining whether the amount of coal passing through said conduit zone during a discrete interval of time is not more than a first preselected value and for generating a partial flow condition signal indicative thereof.

2. Apparatus according to claim 1 including means responsive to said partial flow condition signal for determining whether the amount of coal passing through said conduit zone during said discrete interval of time is not more than a second preselected value and for generating an empty flow condition signal indicative thereof, said first preselected value being greater than said second preselected value.

3. Apparatus according to claim 2 including means responsive to said empty flow condition signal for generating an empty alarm signal after first determining that a predetermined amount of coal has passed through said conduit.

4. Apparatus according to claim 3 including means responsive to said empty alarm signal for stopping said feeder.

5. Apparatus according to claim 1 including means for generating a valve condition signal indicative of whether the shut-off valve is open or closed, and means for generating a coal build-up alarm signal in response to said partial flow condition signal if said valve condition signal indicates that said shut-off valve is closed.

6. Apparatus according to claim 5 including means for automatically simulating said partial flow condition signal and said valve condition signal to test said means for generating said coal build-up alarm signal.

7. Apparatus for monitoring the flow of coal from a bunker through a conduit to a feeder which delivers the coal to a pulverizer, a shut-off valve being disposed between the bunker and the conduit, comprising:

means for detecting the amount of coal present at a conduit zone between the bunker and the feeder and for generating a pulse signal indicative thereof, means responsive to the pulse signal for determining whether the amount of coal passing through the conduit zone during a discrete interval of time is not more than a first preselected value and for generating a partial flow condition signal indicative thereof, means responsive to said partial flow condition signal for determining whether the amount of coal passing through said conduit zone during said discrete interval of time is not more than a second preselected value and for generating an empty flow condition signal indicative thereof, said first preselected value being greater than said second preselected value.

8. Apparatus according to claim 6 including means responsive to said empty flow condition signal for generating an empty alarm signal after first determining that a predetermined amount of coal has passed through said conduit.

9. Apparatus according to claim 7 including means responsive to said empty alarm signal for stopping said feeder.

10. Apparatus according to claims 1 or 7 including means for automatically monitoring said means for detecting said amount of coal present at said conduit zone during said discrete interval of time and for generating a failure alarm signal indicative of the operative status thereof.

11. Apparatus according to claim 10 including means for automatically simulating a failure of said means for detecting said amount of coal present at said conduit zone to test said means for generating said failure alarm signal.

12. Apparatus according to claims 1 or 7 including alarm means for generating an alarm in response to said partial flow condition signal, and means for automatically simulating said partial flow condition signal to test said alarm means.

13. Apparatus according to claims 3 or 8 including means for automatically simulating said empty flow condition signal to test said means for generating said empty alarm signal.

14. Apparatus for monitoring the flow of coal from a bunker through a conduit to a feeder which delivers the coal to a pulverizer, comprising:

a profile switch for detecting the profile of coal at the feeder and for generating a profile condition signal indicative of whether the detected coal profile is less than a full coal profile, means for detecting the amount of coal present at a conduit zone between the bunker and the feeder and for generating a pulse signal indicative thereof, means responsive to said pulse signal for determining whether the amount of coal passing through said conduit zone during a discrete interval of time is not more than a first preselected value and for generating a partial flow condition signal indicative thereof, means for generating a vent alarm signal in response to said partial flow condition signal if said profile condition signal indicates that said detected coal profile is less than said full coal profile.

15. Apparatus according to claim 14 including means responsive to said partial flow condition signal for determining whether the amount of coal passng through said conduit zone during said discrete interval of time is less than a second preselected value and for generating an empty flow condition signal indicative thereof, said first preselected value being gerater than said second preselected value.

16. Apparatus according to claim 15 including means responsive to said empty flow condition signal for generating an empty alarm signal after first determining that a predetermined amount of coal has passed through said conduit.

17. Apparatus according to claim 16 including means responsive to said empty alarm signal for stopping said feeder.

18. Apparatus according to claim 14 including means for automatically simulating said partial flow condition signal and said profile condition signal to test said means for generating said vent alarm signal.

19. Apparatus for monitoring the flow of coal from a bunker through a conduit to a feeder which delivers the coal to a pulverizer, comprising:

a profile switch for detecting the profile of coal at said feeder and for generating a profile condition signal indicative of whether the detected coal profile is less than a full coal profile, means for detecting the amount of coal present at a conduit zone between the bunker and the feeder and for generating a pulse signal indicative thereof, means responsive to said pulse signal for determining whether the amount of coal passing through said conduit zone during a discrete interval of time is more than a first preselected value and for generating a full flow condition signal indicative thereof, means for generating a coal hang-up alarm signal in response to said full flow condition signal if said profile condition signal indicates that the profile of coal at said feeder is less than said full coal profile.

20. Apparatus according to claim 19 including means responsive to said pulse signal for determining whether the amount of coal passing through said conduit zone during said discrete interval of time is not more than said first preselected threshold value and for generating a partial flow condition signal indicative thereof.

21. Apparatus according to claim 20 including means responsive to said partial flow condition signal for determining whether the amount of coal passing through said conduit zone during said discrete interval of time is not more than a second preselected value and for generating an empty flow condition signal indicative thereof, said first preselected value being greater than said second preselected value.

22. Apparatus according to claim 21 including means responsive to said empty flow condition signal for generating an empty alarm signal after first determining that a predetermined amount of coal has passed through said conduit.

23. Apparatus according to claim 22 including means responsive to said empty alarm signal for stopping said feeder.

24. Apparatus according to claim 19 including means for automatically simulating said full flow condition signal and said profile condition signal to test said means for generating said coal hang-up alarm signal.

* * * * *